June 17, 1930.  J. B. VERNAY  1,765,252
ROTATING FILTER APPARATUS
Filed Sept. 17, 1928   4 Sheets-Sheet 1
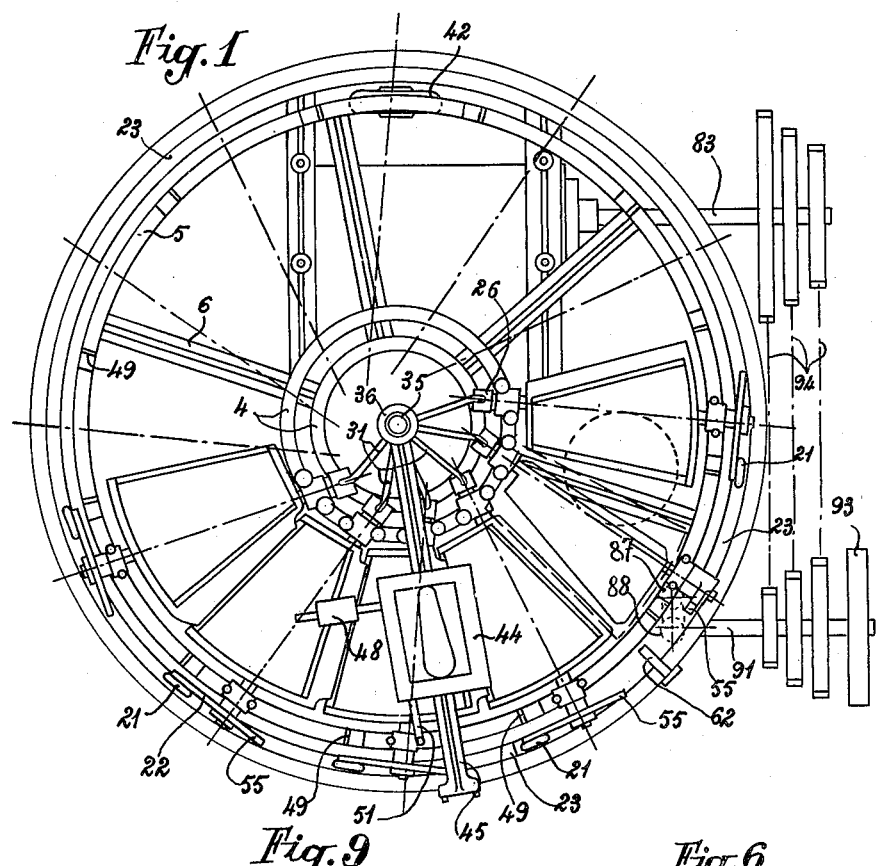
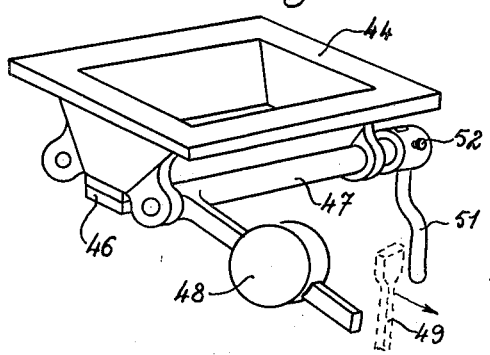
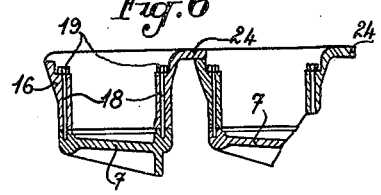
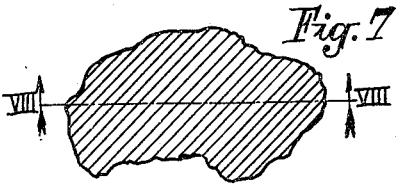
Inventor:
Jean Baptiste Vernay

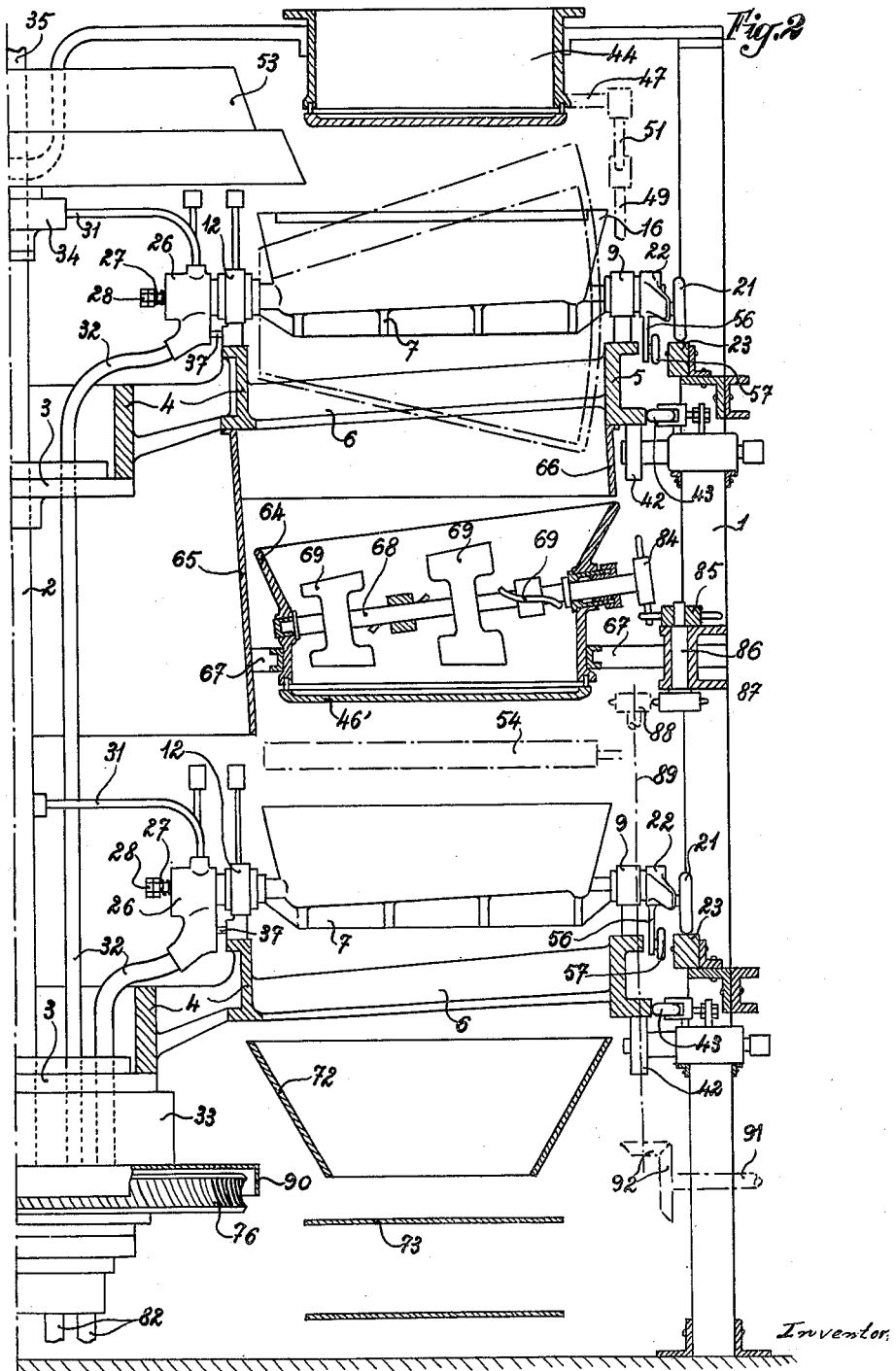

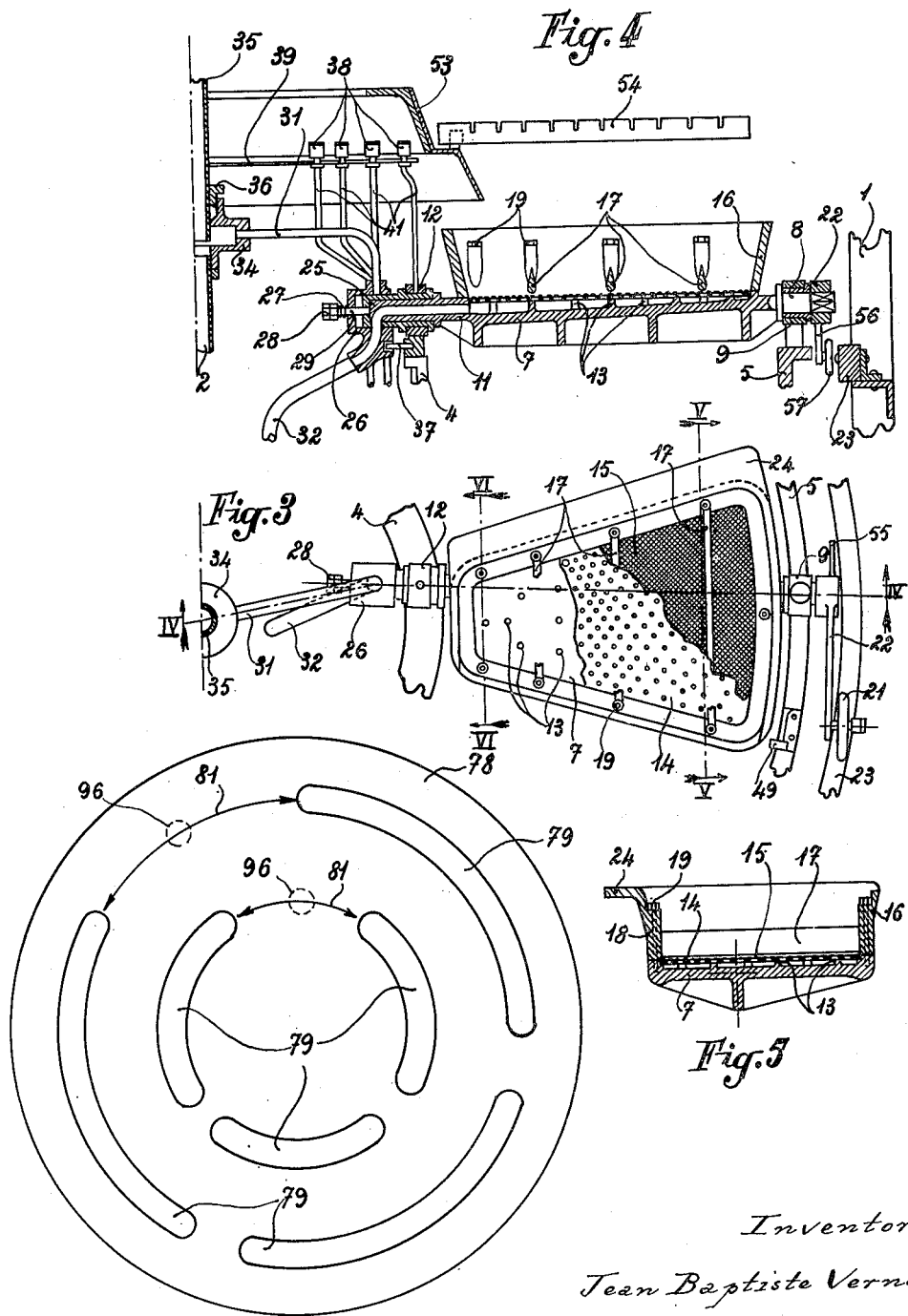

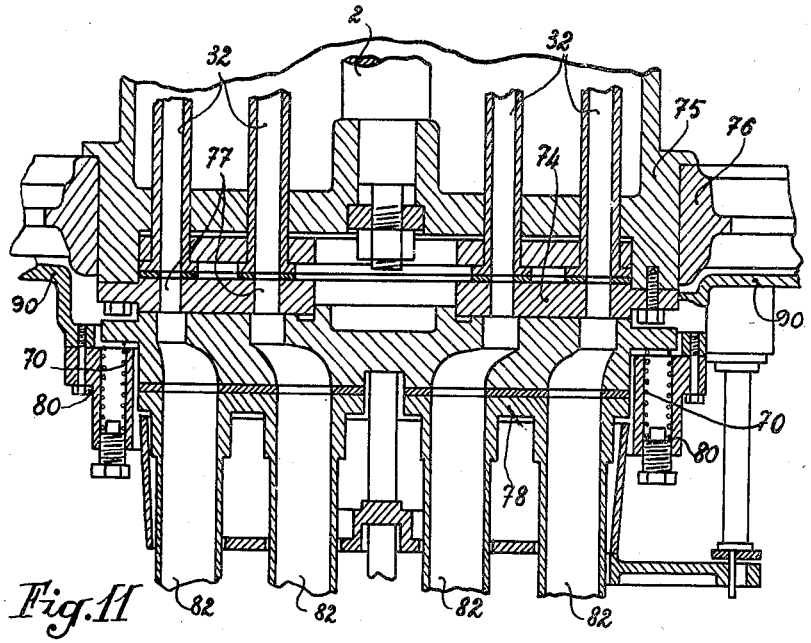
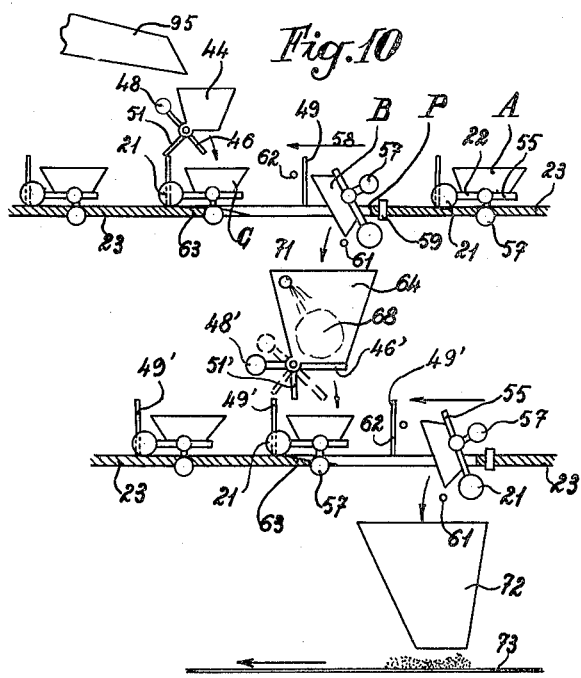

Patented June 17, 1930

1,765,252

UNITED STATES PATENT OFFICE

JEAN BAPTISTE VERNAY, OF VILLEURBANNE, FRANCE

ROTATING FILTER APPARATUS

Application filed September 17, 1928, Serial No. 306,456, and in Germany September 20, 1927.

My invention has for its object a rotating filtering apparatus comprising radially-arranged tipping troughs which receive the material to be filtered and, after filtering and washing, drop it in any suitable receiver.

This apparatus comprises two sets of troughs, the upper one discharging into an intermediate receiver which feeds the lower one. This intermediate receiver is provided with means for breaking the cakes received from the upper set of troughs and for mixing the broken material with water—or any other liquid—before discharging it into the troughs of the lower set.

This filtering apparatus is less cumbersome than the well-known drum filter and it permits of washing many times the cake which is an advantage, for example to recover valuable soluble substances from mixtures of liquid and solid matter.

In the annexed drawings:

Fig. 1 is a diagrammatic plan view of the apparatus, in which some troughs are omitted, the upper cover being removed.

Fig. 2 is a vertical semi-section to an enlarged scale.

Fig. 3 is a detailed plan view of a trough of the upper set with its related parts.

Fig. 4 is a section on line IV—IV of Fig. 3 showing the upper cover and a perforated watering tube.

Fig. 5 is a cross-section on line V—V of Fig. 3.

Fig. 6 is a cross-section on line VI—VI of Fig. 3, partially showing the adjacent trough which has not been represented in Fig. 3.

Fig. 7 is a partial plan view of the bottom of a trough made of lead.

Fig. 8 is a section of the same on line VIII—VIII of Fig. 7.

Fig. 9 shows the feeding funnel.

Fig. 10 is a diagrammatic view of the two sets of troughs and related parts at the feeding and discharging points.

Fig. 11 is a longitudinal section of the distributing gear.

Fig. 12 is a diagrammatic plan view of the openings of the lower plate of the same.

The apparatus (Figs. 1 and 2) comprises a circular fixed frame 1 and a vertical rotating shaft 2 arranged co-axially within the same. This shaft 2 is provided with two collars 3 and each collar 3 supports a sort of wheel comprising a hub 4 (made in two parts) and a rim or crown 5, connected by means of radial arms 6.

Each wheel supports a set of tipping troughs. Each trough (Figs. 4 to 6) comprises a ribbed bottom 7, provided, at its outer end, with a journal 8 rotatable in a bearing 9 supported by the rim 5, and, at its inner end, with a tubular projection 11 journaled in a bearing 12 supported by the hub 4. As shown, the bottom 7 is slightly inclined towards the axis of the apparatus.

The bottom 7 is provided with a number of projections 13 on which rests a perforated plate 14 supporting the filtering cloth 15.

A hollow body 16 forms the walls of the trough. It is provided with stays 17 which are intended to maintain cloth 15 when compressed air is applied to the trough.

This body 16 is fixed onto bottom 7 by means of bolts 18 and nuts 19. As shown, the perforated plate 14 and the filtering cloth 15 are clasped between body 16 and bottom 7.

The trough is not balanced on its axis. It is maintained by means of a roller 21 pivoted at the end of an arm 22 keyed on the journal 8; roller 21 rolls on a circular rail 23 supported by the frame 1; this rail is interrupted at the place where the troughs are to be overturned.

As shown Fig. 6, the body 16 of a trough is provided with a lateral wing 24 projecting over the edge of the body 16 of the adjacent trough; by this arrangement, any dropping of matter or liquid between the successive troughs is avoided.

The trough as described is preferably made of cast-iron. When very corrosive substances are to be dealt with, the troughs are made of lead and then the bottom is provided with parallel grooves (Figs. 7 and 8) opening in an axial duct leading to the tube 11. The perforated plate 14 is then dispensed with and the cloth 15 directly rests on the bottom.

Each trough must be connected in succession with vacuum lines which recover the liquids from the trough, and with a compressed-air line which insures the discharging of the cake when the trough is overturned.

In the apparatus described, these connections are made by a distributing gear and by the hollow journal 11 itself.

This journal 11 (Figs. 3 and 4) is provided with a slightly conical end 25 which is rotatable in a two-way body 26. As shown, the axial duct of journal 11 opens laterally in the conical end 25 which thus forms the plug of a two-way cock. The parts 25 and 26 are maintained together by a spring 27 acting upon the head 28 of an axial bolt 29 screwed in the plug 25.

The two-way body 26 is connected with a compressed-air pipe 31 and with a vacuum pipe 32. The pipes 32 (Fig. 2) of both sets of troughs are connected with the distributing gear 33. The pipes 31 of the lower set are directly connected with the axial bore of shaft 2 which is hollow; the pipes 31 of the upper set are connected with a circular box 34, keyed on shaft 2 at the upper end thereof and rotating on the fixed compressed-air line 35, a stuffing box 36 (Fig. 4) being provided.

When the trough is in its normal position (Figs. 3 to 6) the axial duct of plug 25 is connected with the vacuum pipe 32. When the trough is overturned, this duct is connected with the compressed-air pipe 31.

The two-way body 26 is supported by pipes 31 and 32 which are springy; hence it is always well fit on the plug 25. It is besides prevented against rotation by means of a stud 37 (Figs. 2 and 4) screwed in bearing 12 and cooperating with a lateral hole of body 26.

Fig. 4 shows four oilers 38, supported by a fixed plate 39 and cooperating with the bearings 12 and the two-way bodies 26 of both sets, through pipes 41. In Fig. 2, for the sake of clearness, these oilers are shown directly above the corresponding parts.

The rotating parts are not supported by shaft 2, since their weight would require a shaft of too large diameter. Each rim 5 rests upon rollers 42 (Figs. 1 and 2) the axes of which are fixed to the frame 1, and guiding rollers 43 (Fig. 2) are also provided. Shaft 2 thus is only used for transmitting the torque during the rotation of the apparatus.

The upper set of troughs is fed by means of a funnel 44 (Figs. 1, 2 and 9) supported by an arm 45 (Figs. 1 and 2). This funnel is closed by a flap 46, keyed on a shaft 47 and pressed against the lower end of funnel 44 by the action of a counterweight 48. The upper rim 5 is provided with fingers 49. These fingers are shown in Figs. 1 and 3 and, in Fig. 2, a finger 49 is represented in dash lines (since its true position is not in the plane of the drawing). Shaft 47 is provided with an arm 51 which is adapted to cooperate with the successive fingers 49, the latter thus opening flap 46 (Fig. 10). Arm 51 is adjustable and is locked at the desired position by means of a screw 52.

A fixed screen or cover 53 is provided at the upper part of the apparatus (Fig. 2) for protection of the same against liquid or solid matter which may inadvertently escape from funnel 44. In Fig. 1 this cover is supposedly removed. It supports the watering pipes such as 54 (Fig. 4) which feed the troughs with water (or any other appropriate liquid) for the washing of the cake.

The arm 22 of each trough (Figs. 1, 2, 3 and 4) is provided with an horizontal tail 55 and with a vertically depending tail 56 which supports a roller 57.

Rail 23 (Fig. 10) is interrupted at the point where tipping of the troughs must occur and a fixed abutment 10 is provided, which is adapted to cooperate with the successive rollers 57 for insuring the tipping motion of each trough. In Fig. 10, the troughs move in the direction of arrow 58. Trough A is maintained horizontal by its roller 21 which bears on rail 23. This rail is interrupted at P and thus the trough will tip due to its own weight since, as aforesaid, it is not balanced on its axis.

Should friction be sufficient to maintain the trough horizontal, then roller 57 abuts abutment 59 and thus the trough is positively overturned. It is then in the position B. Roller 21 cooperates with another fixed abutment 61 which insures the complete tipping, the trough being nearly upside down. Tail 55 then contacts with a third fixed abutment 62 and the trough is thus progressively rotated, roller 21 being brought in front of a slope 63 by means of which the trough reassumes its horizontal position, roller 21 rolling again on rail 23.

When the trough is tipped, its cake is rejected by compressed air. When it has reassumed its normal position, the corresponding finger 49 drives arm 51 of funnel 44 and opens flap 46 thus insuring the feeding of the trough.

The material rejected by the troughs of the upper set falls into an intermediate receiver 64 (Figs. 2 and 10), and two concentrical screens 65, 66 (Fig. 2) are provided for the protection of the apparatus, these screens being respectively supported by hub 4 and rim 5 of the upper set.

The intermediate receiver 64 is a funnel-shaped container, supported by beams 67 fixed to frame 1. It is closed by means of a flap 46' identical with flap 46 of funnel 44, and controlled in the same manner, through an arm 51' cooperating with fingers 49' supported by rim 5.

Receiver 64 is provided with a rotating shaft 68 having paddles 69. It may receive water (or any other liquid) from a perforated pipe 71 (Fig. 10).

The cakes received from the troughs of the upper set are broken by paddles 69 and mixed with water. The cakes are then fed to the lower set. Without this breaking up of the cakes the troughs of the lower set would not function satisfactorily as the cakes received from the upper set would not spread themselves out on the filter cloths.

The troughs of the lower set work exactly as those of the upper set. Their cakes are rejected into a funnel 72 which leads them onto an endless conveyor 73. Watering pipes 54 are also provided for this lower set (Fig. 2).

It will be noted that Fig. 2 shows in the same plane funnel 44, receiver 64 and funnel 72 which, obviously, as clearly shown in Fig. 10, are located at different angular positions.

The distributing gear is keyed on shaft 2 at the lower end thereof. It comprises a rotating plate 74 (Fig. 11) which is fixed on the hub 75 of the driving endless-screw wheel 76. It is provided with two circular sets of openings 77, each one of which is connected with a vacuum pipe 32. These inner and lower sets of openings respectively correspond to the upper and lower sets of troughs.

A fixed plate 78 is pressed against plate 74. This plate 78 is provided with the distributing grooves 79. In the apparatus represented in the drawings, three grooves are provided for each set and thus six different liquids may be collected separately. A sector 81 of each set is void of groove, this sector corresponding to the tipped troughs. Grooves 79 are connected with appropriate receivers through pipes 82.

The fixed plate 78 is pressed against plate 74 by means of springs 70 which abut against an annular member 80 fixed to the gear box in which the distributing gear and the endless-screw drive are housed.

Wheel 76 is driven by means of a shaft 83 (Fig. 1) provided with a screw pinion.

Shaft 68 of the intermediate receiver (Fig. 2) is provided with a pinion 84 meshing with a pinion 85 keyed on a shaft 86 supported by the frame 1 (these pinions are preferably formed simply by rollers on which radial cylindrical fingers are screwed). Shaft 86 is driven by a shaft 89 through chain pinions 87 and 88 and through a chain not shown; and shaft 89 is, in turn, driven by a shaft 91 through bevel gears 92.

Shaft 91 is the driving shaft of the machine, the driving pulley 93 (Fig. 1) being keyed on it. It drives shaft 83 through a three-speed chain device 94.

The working of the apparatus will be now readily understood.

It will be supposed that the machine is used in the industry of phosphoric acid. Phosphoric acid in solution must be separated from the muddy liquid obtained by action of sulphuric acid on natural phosphates. This muddy liquid may be pre-treated by a thickening filter or the like, so that a part of clear liquid may be drawn.

The muds are continuously fed into funnel 44 by a pipe 95 or the like (Fig. 10). They are partially dried on the troughs of the upper set, the liquid being collected by the first groove 79; they are then twice washed, the liquids being collected by the two other grooves 79 of the upper set.

They are afterwards rejected into receiver 64. A trough, when tipped over receiver 64, generally contains a compact cake and some liquid on it. The whole is mixed by paddles 69 and a mud is obtained which is fluid enough to form a regular layer on the troughs of the lower set. Water may be added, when necessary, through pipe 71.

The muds are treated in the same way in the troughs of the lower set and they are finally rejected onto conveyer 73.

The solution received from the last groove is used as washing water for the preceding washing, and so on, so as to obtain finally from the first washing, a highly concentrated solution which is used to dilute sulphuric acid before the reaction, phosphoric acid being thus recovered. The liquid collected by the first groove 79 is directed to the concentrating machine.

Each set of troughs could obviously be divided into more or less than three sectors of suction.

Compressed air may also, if desired, be distributed by the distributing gear itself through openings 96 (Fig. 12) provided in plate 78. In this case, tubes 31 are dispensed with and in lieu of plug 25 and body 26 a stuffing box is employed for each trough.

Filtering apparatus of the kind described may comprise only one set of troughs or more than two if necessary.

I claim:

1. A filtering apparatus comprising a plurality of superposed sets of tipping troughs radially arranged with respect to a common substantially vertical axis around which they rotate as a whole; filtering means on said troughs; means to feed the material to be treated in succession into the troughs of the uppermost set; an intermediate receiver located between each two successive superposed sets of tipping troughs; means whereby the troughs of a set are tipped for transferring the material which they contain into the receiver immediately below; means adapted to said receiver to break the material discharged into it; and means for discharging the broken material into the troughs of the lower set.

2. A filtering apparatus as claimed in claim 1, wherein the means to break the material in the intermediate receiver comprise a rotating shaft and paddles secured to the same.

3. A filtering apparatus as claimed in claim 1, wherein a supply of liquid is provided to dilute the material in the intermediate receiver.

4. A filtering apparatus as claimed in claim 1, wherein the means to discharge the broken material from the intermediate receiver into the troughs of the set immediately below comprise a pivoted counterweighted flap to close the discharge end of said intermediate receiver; an arm keyed on the shaft of said flap; and abutments rotating with the troughs to be charged from said receiver, said abutments being adjusted in such a way, that the material received into said intermediate receiver from the troughs of the upper set, is not discharged into the troughs of the lower set until it has been sufficiently broken in said receiver.

In testimony whereof I affix my signature.

JEAN BAPTISTE VERNAY.